US008987571B2

(12) United States Patent
Ur et al.

(10) Patent No.: US 8,987,571 B2
(45) Date of Patent: Mar. 24, 2015

(54) METHOD AND APPARATUS FOR PROVIDING SENSORY INFORMATION RELATED TO MUSIC

(75) Inventors: Shmuel Ur, D. N. Misgav (IL); Maria Grineva, St. Petersburg (RU)

(73) Assignee: Shmuel UR, D.N. Misgav (IL)

( * ) Notice: Subject to any disclaimer, the term of this patent is extended or adjusted under 35 U.S.C. 154(b) by 91 days.

(21) Appl. No.: 13/428,240

(22) Filed: Mar. 23, 2012

(65) Prior Publication Data

US 2012/0260789 A1 Oct. 18, 2012

Related U.S. Application Data

(60) Provisional application No. 61/474,279, filed on Apr. 12, 2011.

(51) Int. Cl.
*G09B 15/02* (2006.01)
*G09B 19/00* (2006.01)

(52) U.S. Cl.
CPC ........ *G09B 19/0038* (2013.01); *G09B 19/0015* (2013.01)
USPC ....................................... 84/470 R

(58) Field of Classification Search
CPC ................... G06F 17/30743; G06F 17/30746; G10H 1/0008

USPC ........................................................ 84/470 R
See application file for complete search history.

(56) References Cited

U.S. PATENT DOCUMENTS

| 6,433,267 | B2 | 8/2002 | Park et al. | |
| 7,528,315 | B2 * | 5/2009 | Goodwin | 84/611 |
| 8,284,070 | B2 * | 10/2012 | Chaudhari et al. | 340/686.1 |
| 2007/0059676 | A1 * | 3/2007 | Jeong | 434/365 |
| 2009/0173213 | A1 * | 7/2009 | Jiang et al. | 84/484 |
| 2009/0192414 | A1 * | 7/2009 | Yasuhara | 600/587 |
| 2009/0259926 | A1 * | 10/2009 | Deliyannis | 715/205 |

OTHER PUBLICATIONS

Großhauser et al, Wearable Multi-Modal Sensor System for Embedded Audio-Haptic Feedback, Proceedings of ISon 2010, 3rd Interactive Sonification Workshop, KTH, Stockholm, Sweden, Apr. 7, 2010.

* cited by examiner

*Primary Examiner* — Jianchun Qin
(74) *Attorney, Agent, or Firm* — Æ ON LAW; Adam L.K. Philipp (57) ABSTRACT

A method, apparatus and product for providing instructions associated with music. The apparatus includes an instruction generating component for generating one or more instructions associated with one or more features within the music. The apparatus also includes an instruction delivery component attached to or worn by a user for delivering the instructions to the user.

14 Claims, 3 Drawing Sheets

METHOD AND APPARATUS FOR PROVIDING SENSORY INFORMATION RELATED TO MUSIC

CROSS-REFERENCE TO RELATED APPLICATIONS

This application is a continuation and claims the benefit of U.S. provisional Application No. 61/474,279 filed Apr. 12, 2011, which is hereby incorporated by reference in its entirety.

TECHNICAL FIELD

The present disclosure relates to music analysis in general, and to generating sensory information related to music, in particular.

BACKGROUND

Music is an important element in the lives of many people around the world, regardless of their age, gender, country, religion or almost any other characteristic. In particular, music is tightly related to dancing, as dancing is mostly done to the sound of music. Some types of dances, for example Swing or Waltz are tightly related to a particular type of music. In such dances, dancers are expected to notice one or more specific beats, for example the beginning of a musical phrase, and perform a relevant movement or gesture at that time. For example, Waltz music is comprised of three-beat phrases, wherein the dancers are expected to take one step forward on the first beat of every phrase, and one step backward on each of the other two beats of every phrase.

Thus, in order to dance some types of dances, at least the leader and preferably other dancers as well, should be able to identify features within the music such as the start of musical phrases and recognize the beat, e.g. strong beat or weak beat. However, mastering the basic phrase structure of a tune may not be enough due to ongoing changes such as increased speed, decreased speed, pauses or the like.

These requirements pose difficulties to people such as beginner dancers, people with certain disabilities and in particular hearing difficulties, people who are highly embarrassed when making mistakes, or the like.

BRIEF SUMMARY

One exemplary embodiment of the disclosed subject matter is an apparatus for providing instructions associated with music, comprising: an instruction generating component for generating one or more instructions associated with one or more features within the music; and an instruction delivery component attached to or worn by a user for delivering the instructions to the user. Optionally, the apparatus further comprises a communication component for transferring the instructions from the instruction generating component to the instruction delivery component. Optionally, within the apparatus the instruction generating component is co-located with the instruction delivery component. Optionally, within the apparatus the instruction delivery component is embedded within an item selected from the list consisting of: a sleeve, a vest, an arm strap, a wrist strap, a head band, eye glasses, and a headset. Optionally, within the apparatus the instructions are selected from the list consisting of: audio instructions, visual instructions, vibratory instructions or haptic instruction.

Another exemplary embodiment of the disclosed subject matter is a method for providing instructions associated with music, comprising: generating one or more instructions associated with one or more features within the music; and delivering the instructions to a user by a device attached to or worn by the user, in accordance with the music.

Yet another exemplary embodiment of the disclosed subject matter is a computer program product comprising: a non-transitory computer readable medium; a first program instruction for generating one or more instructions associated with one or more features within a piece of music; and a second program instruction for delivering the instructions to a user, using a device attached to or worn by the user, in accordance with the music, wherein said first and second program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

In view of the forgoing, there is thus a need in the art for an apparatus and method for providing music-related sensory information or cues to users such as dancers.

The disclosed subject matter is described below with reference to flowchart illustrations and/or block diagrams of methods, apparatus (systems) and computer program products according to embodiments of the subject matter. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the difficulties of people to grasp features of played music such as the start of phrases, strong or weak beats, or the like, which makes it hard or impossible for them to dance well in accordance with the music.

Such people may include people with hearing difficulties that cannot hear the music at all, or cannot hear it well enough.

Another type of people includes novice dancers who do not know how to extract the features from the music or how to act in accordance with the features. For example, in dancing schools, teachers often clap their hands and repeat "one-two-three one-two-three . . . " while repeatedly accentuating one of the numbers, thus helping the students identify the rhythm, but making it harder for them to hear or enjoy the music, and to learn how to feel the music themselves. Also, dancers of different levels may require different levels of assistance while a single teacher can provide only a single set of instructions at a time.

Some techniques exist which provide such cues, such as the WII™ system provided by Nintendo Co. Ltd. of Kyoto, Japan. However, such systems are limited to predetermined tunes. Also, such systems present the cues visually on a fixed display device such as a monitor or a TV set, such that the user has to look specifically in that direction which may be inconvenient and definitely impractical when trying to improve one's dancing. In some cases, the dancer would like to face a different direction at different portions of the dance, and therefore the same display device cannot be used throughout the dance routine.

One technical solution is the generation and provisioning of information or cues related to music being played, to a user such as a dancer, in any sensory manner, such as sound, light, tactile information, haptic manner, or the like. Instructions or cues of one or more types, such as strong beats or weak beats are generated, manually or automatically, upon the music. The information or cues are provided to a user in a manner that does not limit him or disturb him or others when dancing.

In some exemplary embodiments, the user is provided with a device such as a sleeve, a vest, an arm strap, a wrist strap, a head band, glasses, headsets, or any other device which can be attached to the user or worn by the user, wherein the device comprises a mechanism such as a vibrating mechanism which provides a user with vibrations of one or more kinds, related to different cues associated with the music. In some exemplary embodiments, different mechanism may be utilized to provide haptic interface for relying information.

In other embodiments the cues may be provided visually, for example by lights of different colors or intensity, audibly by different sounds, or in any other manner. However auditory cues may limit the user's enjoyment of the music and depending on the volume may also disturb other users unlike the vibration-providing device. Similarly, visual cues may also disturb other users and eliminate the option of personalized instructions. In some exemplary embodiments, a device providing the instructions may be mounted on the user, such as for example, glasses, ear muffs, or the like. Thereby, enabling personalized visual or auditory cues to the dancer.

In some exemplary embodiments, the device can also track the user movements and compare them to the generated instructions, in order to provide the user feedback related to his or her performance. In further embodiments, the system can learn characteristics of the user's behavior, use them as feedback, and adjust the cues accordingly. For example, if the system determines that the user consistently acts in a substantially fixed time before or after he should, then the instruction can be provided at the same amount later or earlier, respectively, so as to cause the user to act at the right time relatively to the music.

One technical effect of utilizing the disclosed subject matter is providing a user with instructions related to the music that is being played, wherein the instructions may be useful for dancing to the sound of the played music. The instructions may be personalized to the user. For example, the instructions may be of a level selected by the user, such as novice or advanced; according to a role such as leader or follower; be provided through visual, auditory or tactile means, or the like.

Another technical effect of utilizing the disclosed subject matter relates to enable people with hearing disabilities or limitations to dance and react to music without cumbersome equipment, either alone or in a group which may consist of hearing and/or deaf dancers.

Yet another technical effect relates to providing a dancing student, whether as part of a class or an independent student with an option to improve his performance, whether he is a novice or an advanced dancer.

Yet another technical effect relates to using the system as part of a TV or a computer game, in which the player dances or performs other movements in accordance with instructions, and is being graded, without having to look in a particular direction.

Figure 1:
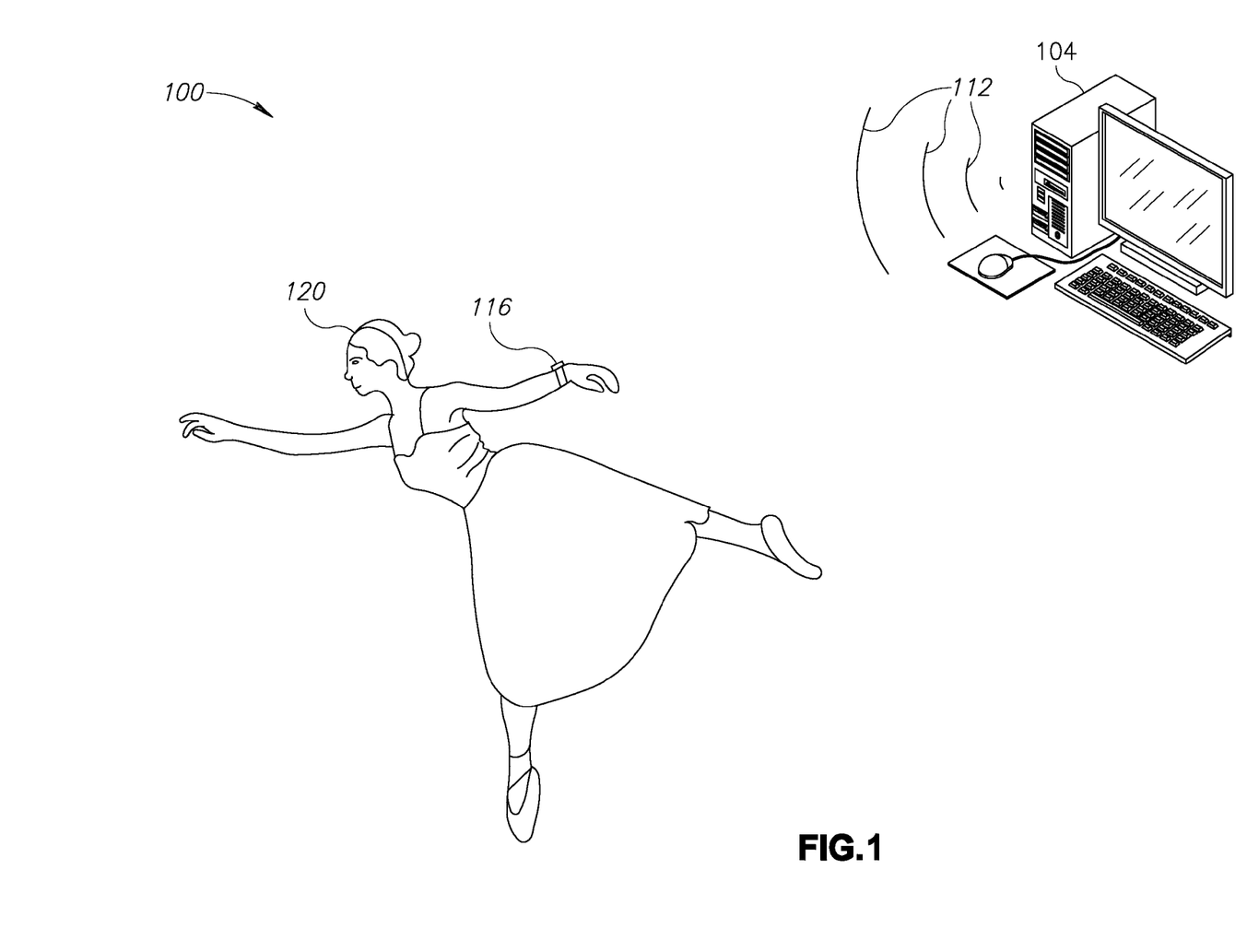
FIG. 1 shows a schematic illustration of a dancer receiving dancing instructions through a sensory device, and a platform for generating or transferring the instructions, in accordance with some embodiments of the disclosed subject matter.

Referring now to FIG. 1, showing an exemplary embodiment of an apparatus for providing sensory information to a dancer. The apparatus comprises a computing platform 104. Computing platform 104 receives music by any manner, such as recorded on a storage device such as a disk, DVD, hard disk, Flash drive or the like, streamed, or the like. Alternatively, music 104 can be provided by a source not associated with computer platform 104, such as a loudspeaker, and captured by computing platform 104 via a microphone or another voice capture device. Computer platform 104 is further detailed in association with FIG. 3 below. Music can be of any style, or of a particular style such as Waltz, Salsa or the like.

Computing platform 104 analyzes music and generates one or more dancing instructions 112. Dancing instructions 112 are transferred to an instruction delivery device 116 worn by or attached to dancer 120. In some exemplary embodiments, instruction delivery device 116 may be mounted on dancer 120 in a different manner.

Computing platform 104 may generate the instructions online simultaneously as the music is being played and when dancer 120 dances. Alternatively, computing platform 104 may analyze the music and generate the instructions offline any time before dancer 120 dances. In yet another embodiment, computing platform 104 may receive the instruction from another source.

Instruction delivery device 116 provides information to dancer 120. In the exemplary illustration of FIG. 1, device 116 is a haptic device which delivers haptic information such as vibrations to dancer 120 in accordance with music. In some embodiments, instruction delivery device 116 may also capture the performance of dancer 120, such that either instruction delivery device 116 or computing platform 104 can evaluate and optionally enhance instructions 112 to improve the performance. Additionally or alternatively, the performance of the dancer 120 may be captured by computing platform 104 such as by utilizing a video camera and analyzing the captured images.

It will be appreciated that FIG. 1 is exemplary only. In other embodiments, computing platform 104 can be embedded within device instruction delivery 116. Additionally or alternatively, a two-piece device may be mounted on dancer 120 such as the computing platform 104 mounted on a belt of dancer 120 and operatively coupled to the device instruction delivery 116 such as using wired or wireless communication.

In further embodiments, instruction delivery device 116 can be replaced with another device, such as a device providing auditory or visual instructions. The device can be adapted to provide instructions to dancer 120 only, or to additional dancers as well. If instructions are provided also to other dancers, then in some embodiments all dancers may receive the same instructions, while in other embodiments each dancer may receive personally adapted instructions.

In some exemplary embodiments, instruction delivery device 116 may be mounted on dancer 120 in a hidden manner. For example, underneath a shirt, within a shoe or the like. In some exemplary embodiments, instruction delivery device 116 may be molded such as to fit within a shoe and provide haptic information to the feet or toes of dancer 120. Additionally or alternatively, instruction delivery device 116 may be designed as an integral part of the shoe or similar apparel.

Figure 2:
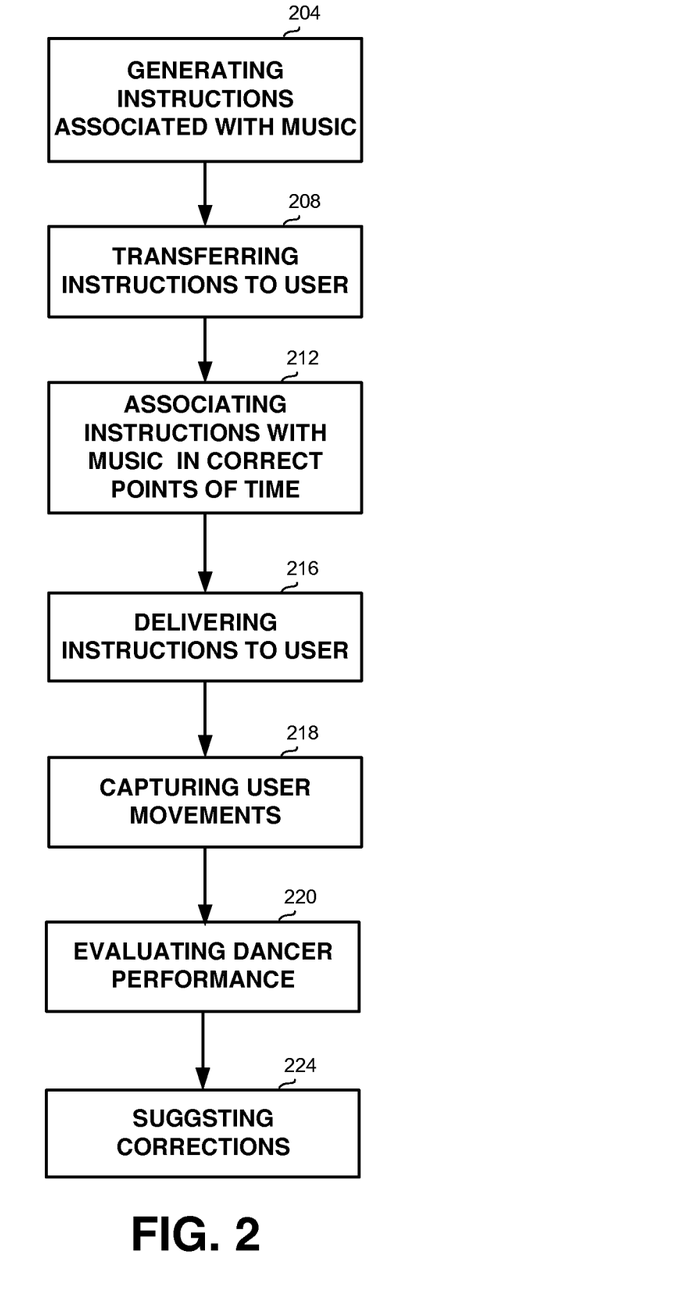
FIG. 2 shows a flowchart of steps in a method for generating and delivering dance instructions to a dancer, in accordance with some exemplary embodiments of the disclosed subject matter.

Referring now to FIG. 2, showing a flowchart comprising steps in a method for providing instructions or cues related to music.

On step 204, instructions or cues associated with given music are generated by a computing platform. The music can be provided to the computing platform as an audio file or stream, in any digital representation, such as MIDI representation, in an analog manner, or in any other form. The music can be vocal, instrumental, or a combination thereof.

The instructions may relate to and require the identification of features, such as but not limited to any of the following features: the start of musical phrases, identification or extraction of style, musical structures for example "ARBA" structure often occurring in jazz music, strong beats, weak beats, beating patterns, fast or slow acceleration, fast or slow deceleration, stops, pauses, a specific beat in the phrase such as the second or third beat, or other features. The generated instructions can be directly associated with the features, for example a strong indication may be associated with a strong beat and a weaker indication may be associated with a weak beat.

The features and hence the instructions can be generated in a number of ways.

In some embodiments, the instructions can be manually generated by a person listening to the audio or referring to notes representation, and indicating the instructions and their respective location relatively to the music, optionally using a dedicated user interface. Each instruction may be associated with a particular one or more timestamps. For example, if the instruction is associated with a time range within the music, the time range can be defined by a beginning timestamp and an end timestamp.

In other embodiments, the features can be extracted using automated systems. Such systems may extract various features within the music, and are known in the art. Each system may be general-purpose or may be associated with a particular type of music. Also, such systems may provide initial instructions which may then be enhanced by a human user.

In yet further embodiments, the movements of a dancer, such as a professional dancer may be tracked and recorded, so that instructions are generated upon those movements. For example, the "rock back" step of swing dancing can be recorded, and the instruction can indicate that the movement is to start at the same time the followed dancer did.

One or more features may relate to determining aspects of the style of the particular music, such as but not limited to: improvisational style, e.g., frantic, lyrical, syncopated, or the like; instrumental style, such as Miles Davis, Louis Armstrong or the like; composer such as Mozart, Bach or others; texture, e.g., homophonic, polyphonic, emotional, or others. Style determination is described, for example, in Dannenberg, Thom, and Watson, "A Machine Learning Approach to Musical Style Recognition" published in 1997 *International Computer Music Conference*, International Computer Music Association (September 1997), pp. 344-347, or in Han, Rho, Dannenberg, and Hwang in "SMERS: Music Emotion Recognition Using Support Vector Regression" in *Proceedings of the* 10*th International Conference on Music Information Retrieval* (*ISMIR* 2009), (October 2009), pp. 651-656, both documents are incorporated herein by reference in their entirety.

The feature determination can relate to low-level perceptual features such as pitch or tempo, but can also use machine learning techniques to build effective style classifiers for interactive systems.

Other features of the music may be obtained by structural analysis, i.e., using relationships between segments or phrases such as similarity, repetition or omission to build models and discover structure in music, and to detect patterns of the music, such as an "AABA" pattern often found in jazz music. The analysis may transcribe the melody of an audio optionally using a similarity or distance metric, identify similar segments, and clusters the segments to form patterns. In some embodiments, spectral information can be used rather than melodic transcription.

The transcription method may include but is not limited to any one or more of the following: monophonic pitch estimation, chroma (spectral) representation, polyphonic transcription followed by harmonic analysis, or others.

Such analyses are described, for example in Dannenberg, "Listening to "Naima": An Automated Structural Analysis of Music from Recorded Audio" published in *Proceedings of the* 2002 *International Computer Music Conference*. San Francisco: International Computer Music Association, (2002), pp. 28-34; in Dannenberg and Hu, "Discovering Musical Structure in Audio Recordings," published in *Music and Artificial Intelligence: Second International Conference*, C. Anagnostopoulo, M. Ferrand, A. Smail, eds., Lecture notes in computer science; Vol 2445: Lecture notes in artificial intelligence, Berlin: Springer Verlag, (2002), pp. 43-57; in Dannenberg and Hu, "Pattern Discovery Techniques for Music Audio," published in *ISMIR* 2002 *Conference Proceedings: Third International Conference on Music Information Retrieval*, M. Fingerhut, ed., Paris: IRCAM, (2002), pp. 63-70; or in Dannenberg and Hu, "Pattern Discovery Techniques for Music Audio," *Journal of New Music Research*, (June 2003), pp. 153-164, all documents are incorporated herein by reference in their entirety.

Other analysis methods, described for example in Dannenberg and Goto, "Music Structure Analysis from Acoustic Signals," published in *Handbook of Signal Processing in Acoustics*, Vol. 1, Springer Verlag. 2009, pp. 305-331, which is incorporated herein by reference in its entirety, uses feature vectors that convey information about music texture or pitch content, wherein the texture generally refers to the average spectral shape and statistical fluctuation, which may reflect the set of sounding instruments, e.g., strings, vocal, or drums.

Pitch content may reflect melody and harmony, which is often independent of texture. Structure may be found in several ways. Segment boundaries can be detected by observing marked changes in locally averaged texture. Similar sections of music can be detected by clustering segments with similar average textures. The repetition of a sequence of music may mark a logical segment. Repeated phrases and hierarchical structures can be discovered by finding similar sequences of feature vectors within a piece of music.

Yet another method for generating instructions includes recording a professional dancer dances to the music, which may include the dancer moving faster or slower, pausing or stopping. Analysing a professional dancer moves may be assisted by phrasing information obtained for example from a human listener or from a system such as described above.

Such method is described, for example by Tobias Groβhauser and Thomas Hermann in "Wearable Multi-Modal Sensor System for Embedded Audio-Haptic Feedback" published in *Proceedings of ISon* 2010, 3rd *Interactive Sonification Workshop*, KTH, Stockholm, Sweden, Apr. 7, 2010, which is incorporated herein by reference in its entirety.

It will be appreciated that the generated instructions can be classified into one or more categories, related for example to expertise level of the dancer, mood, style, purpose, or the like. Thus, one or more instruction sets which may be created for any piece of music, which may or may not partially overlap.

It will be appreciated that the times associated with the instructions may be indicated relative to the beginning of the music or to another point associated with the music, such as beginning of verse, beginning of phrase, or others. The time indications can later be used for associating each instruction with the correct point in time in the music as being played.

On optional step 208 the instructions are transferred to a device which provides the instructions to the user, such as a bracelet-like device. If the method is implemented such that step 204 of generating the instructions is performed by a unit or device carried or worn by the user that delivers the instructions to the user, this step may be omitted. Otherwise, the instructions may be transferred using any required method, such as any wired or wireless technique, including infrared, Bluetooth, or others.

On optional step 212, if the instructions are generated offline rather than as the music is being played, there may be deviations between the music upon which the instructions were generated and the music as it is being played. In such cases the instructions may be associated with the correct point in time with the music as the music is being played, in accordance with the timestamps associated with the instructions. The association can be done by an application or module that receives the music as it is being played, as well as a description of the music such as an audio or MIDI file, and the instructions. The application or module identifies within the description the current location within the music as it is being played, and associates each instruction with the correct point in time. Such application or module is described, for example by Andreas Arzt, Gerhard Widmer and Simon Dixon in "Automatic Page Turning for Musicians via Real-Time Machine Listening" published in *Proc. ECAI*, 2008, pp. 241-245, which is incorporated herein by reference in its entirety. If the instructions are generated online as the music is being played, step 212 can be omitted.

Alternatively, if the instructions are generated in accordance with an audio file rather than with a representation of the music, and it is the same audio file which is being played, then the association is trivial and can be omitted.

In some exemplary embodiments, an offset of the timing may be applied, such as to assist a dancer which is consistently late/early of the correct timing in a predetermined amount of time, such as 150 milliseconds, as explained further hereinbelow.

On step 216, the instructions are presented or delivered to the user using any required sensory manner. In some embodiments, haptic interface can be used wherein the instruction such as an instruction indicating a phrase start, a strong beat or a weak beat may be felt as force exerted on the user's skin. For example, the user can wear a sleeve-, watch- or bracelet-like device which vibrates strongly or weakly in accordance with the instruction or provides an indication in any other way. When it is required to move faster, slower, pause, or the like, the haptic interface can indicate such instructions as well, for example by tightening, releasing, providing extra vibrations, or the like. Such haptic interface is described, for example, by Jilin Zhou; Xiaojun Shen, Petriu, E. M. and Georganas, N. D. in "Linear Velocity and Acceleration Estimation of 3 DOF Haptic Interfaces" published in *Proc. HAVE 2008—IEEE Int. Workshop on Haptic, Audio and Visual Environments and their Applications*, pp. 137-142, Ottawa, ON, Canada, Oct. 2008, incorporated herein by reference in its entirety.

In alternative embodiments, the instructions may be conveyed using audio interface, for example by playing audio streams sounding "clicks" at one or more volume levels, the words "five, six, seven, eight" before a phrase starts, or the like. In some embodiments, the instructions are on a separate channel from the music itself, so as not to interfere with the enjoyment of other people. In addition, different dancers may require different instructions. Each dancer that would like to receive instructions may wear an appropriate device, such as an ear muff, an ear plug, an ear phone or the like, which is configured to provide the audio indications of the instructions to the user. In some exemplary embodiments, if the instructions are intended for all dancers, they can be broadcasted together with the music.

In yet alternative embodiments, vision can be used as a means for conveying the instructions, for example by using augmented reality glasses. If the instructions are intended for all dancers, they can be conveyed as blinking lights, possibly of different colours or intensities.

If more than one set of instructions is available for the music, the dancer or another person such as an instructor may choose the relevant set among the multiplicity of instruction sets generated on step 204, and this set is being transferred to the user on step 208 if required, associated with the corresponding points in time on step 212 if required, and delivered to the user on step 216.

On optional step 218, the movements of the user such as a dancer, or their timing, may be captured, wherein the movements are associated with the delivered instructions. Determining when a person stepped can be done in a variety of ways, such as methods used by step counting devices, or a method as described by Tobias Groβhauser and Thomas Hermann in "Wearable Multi-Modal Sensor System for Embedded Audio-Haptic Feedback" published in *Proceedings of ISon* 2010, 3*rd Interactive Sonification Workshop*, KTH, Stockholm, Sweden, Apr. 7, 2010, which is incorporated herein by reference in its entirety.

On optional step 220, the performance of the dancer as captured on step 218 may be evaluated to determine its compliance with the instructions. In some embodiments, the time difference between the time the instruction is delivered, and the time the user made a movement such as a step, is determined. Since the timing of the instruction is known, the time difference can be determined for each instruction. The time differences can be accumulated over a period of time, averaged, or undergo any other mathematical or logical operation to determine the user's performance. The performance can be presented to a user or a tutor, or used for further improvement as described below.

If the dancer's performance does not meet a predetermined criteria, for example maximal average deviation, maximal deviation for a particular instruction or particular type of instructions or others, then on optional step 212 corrective action can be taken in some embodiments, For example, if on the average the user performs the instructions 0.1 seconds too late and no significant standard deviation exists, then the instructions can be delivered 0.1 seconds earlier, so that the user performs the instructions closer to the correct time in many cases. After some practice by the user, the correction may be eliminated in order to re-evaluate the dancer's performance. The correction may then be maintained, cancelled or updated as appropriate.

Figure 3:
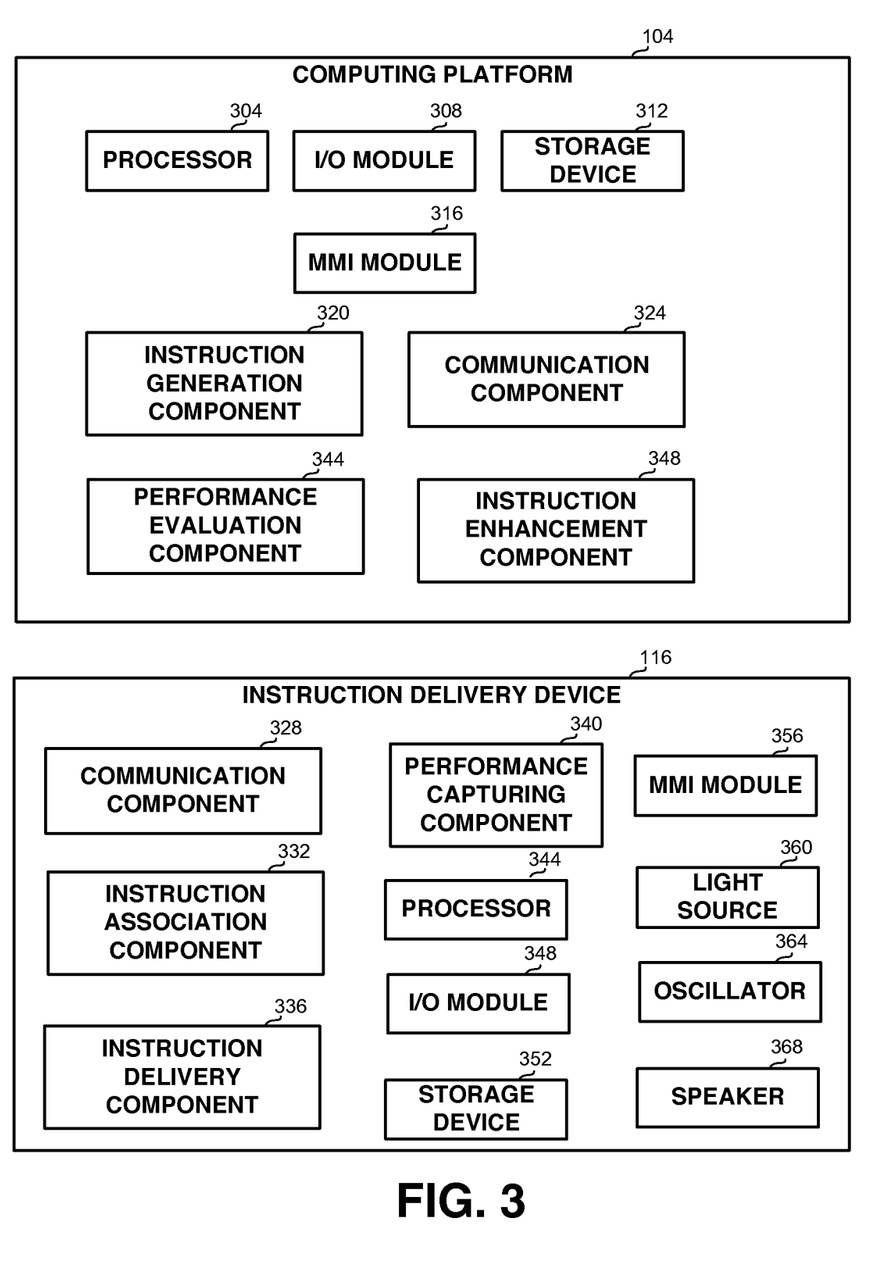
FIG. 3 shows a block diagram of components of an apparatus for generating and delivering dance instructions to a dancer, in accordance with some exemplary embodiments of the disclosed subject matter.

Referring now to FIG. 3, showing a block diagram of components in an apparatus for providing sensory information associated with music.

The apparatus comprises computing platform 104 and instruction delivery device 116 also shown in FIG. 1.

In some exemplary embodiments, computing platform 104 may comprise a processor 304. Processor 304 may be a Central Processing Unit (CPU), a microprocessor, an electronic circuit, an Integrated Circuit (IC) or the like. Alternatively, processor 304 can be implemented as firmware programmed for or ported to a specific processor such as digital signal processor (DSP) or microcontrollers, or can be implemented as hardware or configurable hardware such as field programmable gate array (FPGA) or application specific integrated circuit (ASIC).

In some exemplary embodiments of the disclosed subject matter, computing platform 104 may comprise an Input/Output (I/O) module 308. I/O module 308 may be utilized to receive input or provide output to and from computing platform 104, for example receiving music, receiving user commands or parameters related to the apparatus, storing and retrieving information to and from a storage device, providing output for viewing data, or the like.

In some exemplary embodiments, computing platform 104 may comprise one or more storage devices such as storage device 312, for storing for example music, instructions, data related to one or more users, or the like. Storage device 312 may be persistent or volatile. For example, storage device 312 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause computing platform 104 to perform acts associated with any of the steps of the method of FIG. 2, for example generating instructions associated with music, transferring the music, or the like.

A user (not shown) may utilize a man-machine interface (MMI) device 316 such as a terminal, a display, a keyboard, an input device, or the like to interact with the system, or to invoke the apparatus. It will however be appreciated that the system can operate without human operation.

The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

The components executed by processor 304 include instruction generation component 320, for receiving music, analyzing it and generating dancing instructions, such as instructions indicating phrase start, strong beat, weak beat or other instructions, as described in association with step 204 of FIG. 2.

Computing platform 104 may further comprise communication component 324 for communicating with instruction delivery device 116, which may comprise a corresponding communicating component 328. If computing platform 104 and instruction delivery device 116 are co-located on one device, then communication component 324 as well as communication component 328 may be omitted.

Instruction delivery device 116 may comprise an instruction association component 332 for associating an instruction with music being played at the correct point in time. Instruction association component 332 may receive a representation of the music such as a MIDI file, the instructions with associated time indications, and the music as it is being played. Instruction association component 332 then associates the instructions with the correct times relatively to the music being played. If the instructions are generated online as the music is being played to the dancers, then instruction association component 332 may be omitted. Additionally or alternatively, instruction association component 332 may be omitted in case that the instructions are already associated with a time to be provided to the user (e.g., time indicated by computing platform 104 with respect to each instruction).

Instruction delivery device 116 further comprises instruction delivery component 336 for delivering the instruction to the user in any sensory manner, such as haptic, vibration, light, sound, or the like. In some embodiments instruction delivery device 116 may be attached to the body of the user or worn by the user, such as on his hand, arm, wrist, head, forehead, shoulder, leg, waist, or the like, so that the instruction is delivered personally to the user and not to other dancers. It will be appreciated that instruction delivery device 116 may comprise a driver for receiving the instructions and sending activation commands to instruction delivery component 336.

In some embodiments, instruction delivery device 116 may comprise a light source 360, an oscillator 364, a speaker 368 or the like, to be used by instruction delivery component 336 to deliver the instruction to the dancer.

In some embodiments, instruction delivery device 116 or another device which may be dedicated for this purpose, comprises performance capturing component 340, which captures the timing of the user motions which may be associated with the provided instructions, such as steps taken by the user.

If the apparatus is adapted to capture the user's performance, then computing platform 104 or any other computing platform may comprise performance evaluation component 344, which compares the times associated with one or more instructions to the times at which the user performed the instructions, as detected by performance capturing component 340.

Computing platform 104 or any other computing platform may comprise instruction enhancement component 348 for enhancing the instructions or their associated time indications in accordance with the user's performance. For example, if the user performance is below a predetermine measure, such as average time difference between an instruction and when the instruction is performed exceeding a predetermined period of time, and possibly additional conditions such as standard deviation of the time difference being under a predetermined value, then instruction enhancement component 348 may be operative to adjust the instructions accordingly, omit or add certain instructions or instruction types, or the like.

It will be appreciated that instruction delivery device 116 can further comprise a processing unit 344, such as a general processing unit, an ASIC device, or the like, as described in association with processor 304 above. Similarly, instruction delivery device 116 may comprise an I/O module 348, storage device 352, and/or a MMI module 356, as detailed in association with processing unit 304, I/O module 308, storage device 312, and/or a MMI module 316 above.

It will be appreciated that the apparatus of FIG. 3 is exemplary only, and that multiple other structures and manners of splitting the functionality between one or more devices can be devised.

The disclosed method and apparatus can be used for a variety of purposes and target audiences. One such audience comprises people with hearing limitations or disabilities who are interested in dancing. These people can dance using the disclosed method and apparatus, either alone or in a group that may comprise hearing and/or non-hearing people. People with mental problems who react better to one type of communication such as touch then to other such as oral, may also benefit from using the haptic instructions. The method and apparatus can thus enable people with disabilities to participate in social dancing and troupe dancing despite their limitations.

Another type of users that may benefit from the disclosed method and apparatus relates to dance students, who can use the method and apparatus independently for improving their skills, either alone or in troupe dancing, or to dancing schools in which a tutor may provide each student with a personally adapted set of instructions. The method and apparatus can also be used for improving coordination between dancers in a troupe. It will be appreciated that even people who do not actually dance, such as people who just enjoy listening to the music and following its rhythm, "chair dancers", or others can enjoy receiving the instructions thus further feeling the music and enhancing their listening experience. The disclosed method and apparatus may thus be used for all types of persons interested in music or dancing, at all levels and for all purposes, including listening, dancing at all levels, individual dancers or troupe dancers.

Yet another type of users may relate to computer game players. Dancing games are popular and players may benefit from augmenting specific instructions into the music in one or more ways. The instructions can be made amusing, such as touching one's nose, making funny noise as an instruction, or the like. Using the disclosed method and apparatus, the instructions may be provided to the player in a personalized manner. Further, the instructions may be provided in a manner that does not force the user to look in a specific direction at all times.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the parts of the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An apparatus comprising:
   a receiver for obtaining music being played;
   an instruction generating component for generating at least one instruction based on at least one musical feature within the music, wherein each musical feature is a location within a musical phrase within the music being played, wherein each instruction, when delivered to a user, conveys information sufficient for the user to identify the location within the musical phrase within the music being played, wherein the at least one instruction is associated with at least one timestamp indicating a timing of delivery of the at least one instruction to the user; and
   an instruction delivery component adapted to be attached to or be worn by the user for delivering the at least one instruction to the user;
   a user movement capturing component for capturing at least one movement of the user or timing thereof, wherein the at least one movement corresponds to the at least one instruction;
   a performance evaluation component for determining a performance measure based on a time difference between when the at least one instructions is delivered and when the user performed the at least one movement; and
   an instruction enhancement component for modifying the at least one timestamp in accordance with the performance measure, wherein the modification is adapted to compensate for the reaction by the user to the at least one instruction so as to cause future delivery of the at least one instruction at a different timing.

2. The apparatus of claim 1 further comprising at least one communication component for transferring the at least one instruction from the instruction generating component to the instruction delivery component.

3. The apparatus of claim 1 wherein the instruction generating component is co-located with the instruction delivery component.

4. The apparatus of claim 1 wherein the instruction delivery component is embedded within an item selected from the list consisting of: a sleeve, a vest, an arm strap, a wrist strap, a head band, eye glasses, and a headset.

5. The apparatus of claim 1 wherein the at least one instruction is selected from the list consisting of: vibratory instruction and haptic instruction.

6. The apparatus of claim 1 further comprising a driver for receiving the at least one instruction and sending activation commands to the instruction delivery component.

7. The apparatus of claim 1, wherein said instruction generating component is configured to analyze the music and to extract the at least one musical feature from the music.

8. The apparatus of claim 1, wherein the at least one musical feature is a musical feature that is selected from the group consisting of: a beat within a phrase, and a strong beat within a phrase.

9. The apparatus of claim 1, wherein the location within a musical phrase within the music being played is selected from the group consisting of: a start of the musical phrase, a strong beat within the musical phrase, and a predetermined beat within the musical phrase.

10. The apparatus of claim 1, wherein the at least one musical feature is a musical feature that is useful for performing a dancing routine with respect to the music, wherein the instruction is neutral to a type of a dance step to be made and is useful for timing the dance step.

11. A method comprising:
    obtaining music being played;
    generating at least one instruction based on at least one musical feature within the music, wherein each musical feature is a location within a musical phrase within the music being played, wherein each instruction, when delivered to a user, conveys information sufficient for the user to identify the location within the musical phrase within the music being played, wherein the at least one instruction is associated with at least one timestamp indicating a timing of delivery of the at least one instruction to the user;
    delivering the at least one instruction to the user by a device attached to or worn by the user, in accordance with the music;
    capturing at least one movement of the user or timing thereof, wherein the at least one movement corresponds to the at least one instruction;
    determining a performance measure based on a time difference between when the at least one instructions is delivered and when the user performed the at least one movement; and
    modifying the at least one time stamp in accordance with the performance measure, wherein the modification is adapted to compensate for the reaction by the user to the at least one instruction so as to cause future delivery of the at least one instruction at a different timing.

12. The method of claim 11 further comprising transferring the at least one instruction to the device.

13. The method of claim 11, wherein the at least one musical feature is a musical feature that is useful for performing a dancing routine with respect to the music, wherein the instruction is neutral to a type of a dance step to be made and is useful for timing the dance step.

14. A computer program product comprising:
    a non-transitory computer readable medium;
    a third program instruction for obtaining music being played;
    a first program instruction for generating at least one instruction based on at least one musical feature within a piece of the music, wherein each musical feature is a location within a musical phrase within the music being played, wherein each instruction, when delivered to a user, conveys information sufficient for the user to identify the location within the musical phrase within the music being played, wherein the at least one instruction is associated with at least one timestamp indicating a timing of delivery of the at least one instruction to the user; and
    a second program instruction for delivering the at least one instruction to the user, using a device attached to or worn by the user, in accordance with the music;
    a third program instruction for capturing at least one movement of the user or timing thereof, wherein the at least one movement corresponds to the at least one instruction;
    a fourth program instruction for determining a performance measure based on a time difference between when the at least one instructions is delivered and when the user performed the at least one movement;
a fifth program instruction for modifying the at least one time stamp in accordance with the performance measure, wherein the modification is adapted to compensate for the reaction by the user to the at least one instruction so as to cause future delivery of the at least one instruction at a different timing;
wherein said first, second, third, fourth and fifth program instructions are stored on said non-transitory computer readable medium.

\* \* \* \* \*